United States Patent
Bishwas

(10) Patent No.: US 12,077,871 B2
(45) Date of Patent: Sep. 3, 2024

(54) PRESSURE COMPENSATING SYSTEM AND A HIGH-PRESSURE ELECTROLYSER SYSTEM COMPRISING THE SAME

(71) Applicant: Hymeth ApS, Soborg (DK)

(72) Inventor: Sumon Bishwas, Copenhagen (DK)

(73) Assignee: Hymeth APS (DK)

( * ) Notice: Subject to any disclaimer, the term of this patent is extended or adjusted under 35 U.S.C. 154(b) by 978 days.

(21) Appl. No.: 17/040,014

(22) PCT Filed: Mar. 21, 2019

(86) PCT No.: PCT/EP2019/057172
§ 371 (c)(1),
(2) Date: Sep. 21, 2020

(87) PCT Pub. No.: WO2019/180184
PCT Pub. Date: Sep. 26, 2019

(65) Prior Publication Data
US 2021/0017655 A1    Jan. 21, 2021

(30) Foreign Application Priority Data

Mar. 22, 2018 (EP) .................................... 18163252

(51) Int. Cl.
C25B 9/05 (2021.01)
C25B 1/04 (2021.01)
(Continued)

(52) U.S. Cl.
CPC ................. C25B 1/04 (2013.01); C25B 9/05 (2021.01); C25B 11/02 (2013.01); C25B 15/02 (2013.01);
(Continued)

(58) Field of Classification Search
CPC . C25B 1/04; C25B 9/05; C25B 15/02; H01M 8/0441; H01M 8/04402;
(Continued)

(56) References Cited

U.S. PATENT DOCUMENTS 2,208,352 A   7/1940   Pichler-Tennenberg et al.
2,695,874 A   11/1954  Zdansky
(Continued)

FOREIGN PATENT DOCUMENTS

CN   1133619 A   10/1996
CN   1221461 A   6/1999
(Continued)

OTHER PUBLICATIONS

Fowles ("Measurement of Flow", Instrumentation Reference Book (Fourth Edition), 2010, pp. 31-68) (Year: 2010).*
(Continued)

*Primary Examiner* — Alexander W Keeling
(74) *Attorney, Agent, or Firm* — McAndrews, Held & Malloy, Ltd.

(57) ABSTRACT

A pressure compensating system (1) for a dual fluid flow system, wherein the pressure compensating system (1) comprises: a fluid pipe (3) having a first fluid pipe portion (3a) and a second fluid pipe portion (3b), wherein the first fluid pipe portion (3a) has a first fluid inlet (5a) and a first fluid outlet (7a) for a first fluid flow ($O_2$), wherein the second fluid pipe portion (3b) has a second fluid inlet (5b) and a second fluid outlet (7b) for a second fluid flow ($H_2$) separate from the first fluid flow ($O_2$), and a pressure compensator (11) arranged in the fluid pipe (3), separating the first fluid pipe portion (3a) and the second fluid pipe portion (3b), wherein the pressure compensator (11) is configured to move in the fluid pipe (3) between the first fluid outlet (7a) and the second fluid outlet (7b) to thereby at least partially obstruct (Continued)

one of the first fluid outlet (7a) and the second fluid outlet (7b) in response to a pressure differences between the first fluid pipe portion (3a) and the second fluid pipe portion (3b) to provide pressure compensation between the first fluid pipe portion (3a) and the second fluid pipe portion (3b).

13 Claims, 2 Drawing Sheets

(51) Int. Cl.
    *C25B 11/02*     (2021.01)
    *C25B 15/02*     (2021.01)
    *C25B 15/08*     (2006.01)
    *F16K 17/19*     (2006.01)
    *F16K 31/02*     (2006.01)

(52) U.S. Cl.
    CPC .............. *C25B 15/08* (2013.01); *F16K 17/19* (2013.01); *F16K 31/02* (2013.01)

(58) Field of Classification Search
    CPC ......... H01M 8/04432; H01M 8/04761; H01M 8/04783; H01M 2200/20; F16K 17/19–17/196
    See application file for complete search history.

(56) References Cited

U.S. PATENT DOCUMENTS

| | | | |
|---|---|---|---|
| 4,902,397 A | | 2/1990 | Kelham |
| 5,458,095 A * | | 10/1995 | Post .................... C25B 1/04 |
| | | | 123/3 |
| 7,097,748 B2 | | 8/2006 | Duffy et al. |
| 7,226,529 B2 | | 6/2007 | Meltser |
| 2002/0100681 A1 * | | 8/2002 | Kirk .................... C25B 15/02 |
| | | | 204/290.01 |
| 2003/0230495 A1 * | | 12/2003 | Anderson ............. C25B 1/04 |
| | | | 204/263 |
| 2004/0072040 A1 * | | 4/2004 | Duffy .................. C25B 1/04 |
| | | | 204/278 |
| 2005/0072688 A1 | | 4/2005 | Meltser |
| 2009/0258258 A1 * | | 10/2009 | Knepple ........... H01M 8/04104 |
| | | | 429/492 |
| 2011/0253070 A1 * | | 10/2011 | Haring ................ F02M 25/12 |
| | | | 123/3 |
| 2012/0208099 A1 * | | 8/2012 | Chen .................. C01B 3/384 |
| | | | 423/650 |
| 2014/0374246 A1 * | | 12/2014 | Lin ................... A61M 16/125 |
| | | | 204/278 |

FOREIGN PATENT DOCUMENTS

| | | | |
|---|---|---|---|
| CN | 101366130 A | | 2/2009 |
| CN | 203653704 U | * | 6/2014 |
| CN | 104066872 A | | 9/2014 |
| CN | 106801232 A | | 6/2017 |
| DE | 597180 | | 5/1934 |
| EP | 0296736 A1 | | 12/1988 |
| GB | 473103 | | 10/1937 |
| JP | S64083681 A | | 3/1989 |
| JP | H06173053 A | | 6/1994 |
| JP | 2003342773 A | | 12/2003 |
| JP | 2007100204 A | | 4/2007 |
| JP | 2010236089 A | | 10/2010 |
| JP | 3202182 U | | 9/2016 |
| WO | 0070126 A1 | | 11/2000 |
| WO | 2012011252 A | | 9/2013 |

OTHER PUBLICATIONS

1 Hearing Notice for Indian Patent Application No. 202047045408, mailed May 5, 2023, 2 pages.
Office Action and Search Report for Chinese Patent Application No. 201980030632.3, mailed Oct. 24, 2022, 7 pages.
Office Action for Brazilian Patent Application No. BR112020019118-3, mailed Mar. 2, 2023, 5 pages.
1 Examination Report for Indian Patent Application No. 202047045408, mailed Feb. 23, 2022, pp. 1-4.
Second Office Action for Chinese Patent Application No. 2019800306323, mailed Mar. 31, 2023, 6 pages.
International Preliminary Report on Patentability corresponding to International Patent Application No. PCT/EP2019/057172, mailed Jun. 18, 2021, 13 pages.
Office Action for Japanese Patent Application No. 2020-551279, mailed Mar. 22, 2023, 6 pages.
EPO Communication-Article 94(3) for Application No. 18163252.2-1108, dated May 12, 2020, 4 pages.
Extended European Search Report for European Patent Application No. Application No. 18163252.2-1108, dated, Oct. 1, 2018, 8 pages.
International Search Report and Written Opinion corresponding to International Patent Application No. PCT/EP2019/057172, mailed Jul. 9, 2019, 12 pages.
International Preliminary Report on Patentability corresponding to International Patent Application No. PCT/EP2019/057172, mailed Apr. 17, 2020, 7 pages.
Notice of Office Action for Korean Patent Application No. 10-2020-7030343, mailed Feb. 16, 2024, 9 pages.

* cited by examiner

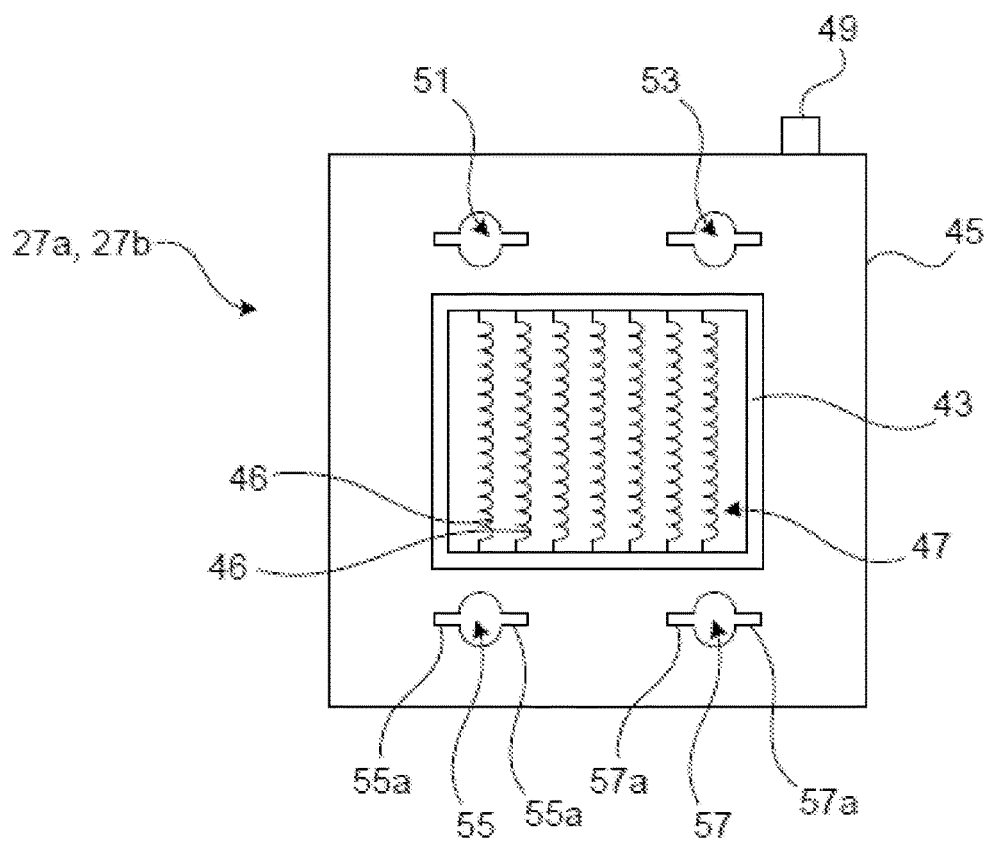
Fig. 3
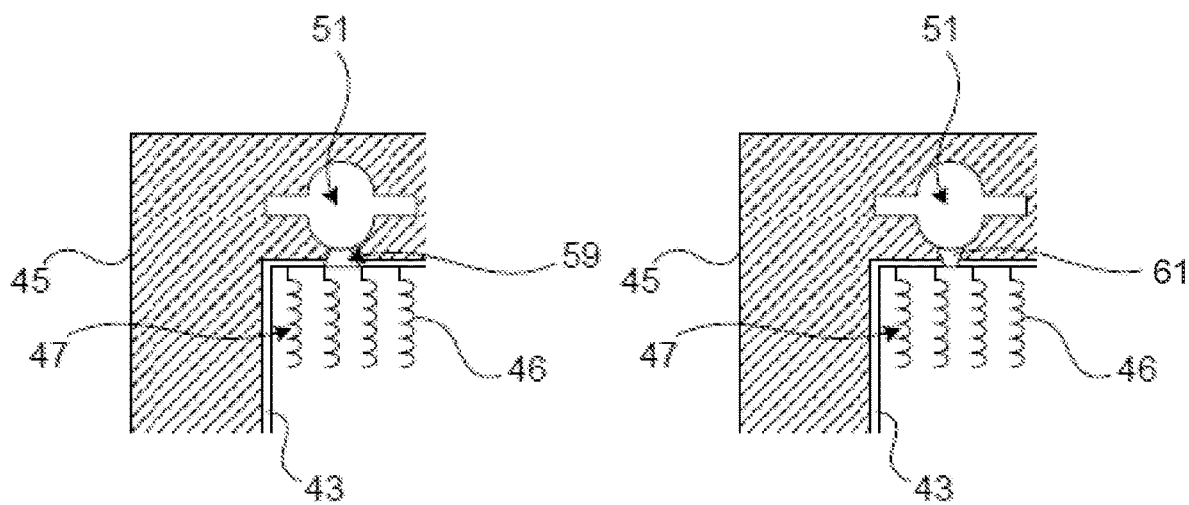
Fig. 4aFig. 4b

PRESSURE COMPENSATING SYSTEM AND A HIGH-PRESSURE ELECTROLYSER SYSTEM COMPRISING THE SAME

CROSS-REFERENCE TO RELATED APPLICATIONS/INCORPORATION BY REFERENCE

The present application is the U.S. national phase under § 371 of International Application No. PCT/EP2019/057172, having an international filing date of Mar. 21, 2019, which claims priority to EP Patent Application No. 18163252.2, filed Mar. 22, 2018. Each of the above-mentioned prior-filed applications is hereby expressly incorporated herein by reference in its entirety.

TECHNICAL FIELD

The present disclosure relates to electrolysis and in particular to high-pressure electrolysis.

BACKGROUND

Electrolysis of water is a process in which water molecules are decomposed, forming hydrogen gas and oxygen gas. This process occurs as a result of an electric current flowing between two electrodes submerged in water.

For certain applications it may be desirable to compress the hydrogen gas and the oxygen gas generated in the electrolysis process. Traditionally, this gas compression has been made once the gas had been discharged from the electrolyser system.

More recently, it has been proposed to perform gas compression already during electrolysis. An example of a high-pressure electrolyser system is disclosed in US 20050072688 A1. The system includes a pump for pumping water into electrolytic cells, a check-valve preventing water to flow back to the pump and an electrolyser stack comprising the electrolytic cells. The system is designed to withstand a differential pressure of about 138 bar between the anode and cathode side. Moreover, the system comprises a pressure regulating valve controlling the hydrogen flow and thus the hydrogen pressure in the hydrogen flow path. The pressure differential at which the pressure regulating valve opens to allow hydrogen to flow from a separator to a storage tank is set to cause the pressure in a separator, the hydrogen flow path and the cathode side of the electrolyser to reach a desired hydrogen production pressure. The pressure regulating valve remains closed, causing the cathode flow path to be deadheaded, while hydrogen is produced in the cathode side of electrolyser. As hydrogen is continued to be produced, the pressure in the cathode side of electrolyser, the hydrogen flow path and separator increases until a sufficient pressure differential occurs which causes the pressure regulating valve to open allowing a portion of the hydrogen in separator to pass to storage tank.

SUMMARY

The design in US 20050072688 A1 requires that the cathode and anode sides are constructed to withstand a high differential pressure. It furthermore relies upon a control system to control the pressure regulating valve to reach a desired hydrogen production pressure.

In view of the above, a general object of the present disclosure is to provide a pressure compensating system which solves or at least mitigates the problems of the prior art.

There is hence according to a first aspect of the present disclosure provided a pressure compensating system for a dual fluid flow system, wherein the pressure compensating system comprises: a fluid pipe having a first fluid pipe portion and a second fluid pipe portion, wherein the first fluid pipe portion has a first fluid inlet and a first fluid outlet for a first fluid flow, wherein the second fluid pipe portion has a second fluid inlet and a second fluid outlet for a second fluid flow separate from the first fluid flow, and a pressure compensator arranged in the fluid pipe, separating the first fluid pipe portion and the second fluid pipe portion, wherein the pressure compensator is configured to move in the fluid pipe between the first fluid outlet and the second fluid outlet to thereby at least partially obstruct one of the first fluid outlet and the second fluid outlet in response to a pressure differences between the first fluid pipe portion and the second fluid pipe portion to provide pressure compensation between the first fluid pipe portion and the second fluid pipe portion.

Any pressure difference between the interior of the first fluid pipe portion and interior of the second fluid pipe portion may hence be equalised by the pressure compensator. The pressure compensation is robust and requires no sensors or electronics such as an external controller. Equal or essentially equal pressure in the first fluid pipe portion and the second fluid pipe portion may be obtained by displacement of the pressure compensator in the fluid pipe, in accordance with the pressure difference at a first side of the pressure compensator facing the first fluid pipe portion and a second side facing the second fluid pipe portion. The pressure compensation is hence self-adjusting.

According to one embodiment the fluid pipe has an inner surface provided with a friction-reducing coating in a region accommodating the pressure compensator. The friction-reducing coating may for example comprise or consist of polytetrafluoreten (PTFE). PTFE can be used in high temperature and corrosive environments. Hence, less heat will be developed due to the reduced friction between the pressure compensator and the fluid pipe.

According to one embodiment the first fluid pipe portion has an inner surface provided with a friction-reducing coating. The friction-reducing coating may for example be, comprise or consist of PTFE.

According to one embodiment the second fluid pipe portion has an inner surface provided with a friction-reducing coating. The friction-reducing coating may for example be, comprise or consist of PTFE.

Upstream of the first fluid outlet, the first fluid pipe portion may comprise a first gas filtration system including a first membrane assembly. The first membrane assembly is hence arranged such that the first fluid flow passes through the first membrane assembly before flowing through the first fluid outlet. The first membrane assembly may comprise a plurality of membranes, for example two support membranes such as two needlefelt or cloth membranes, and a filter membrane such as a PTFE membrane, sandwiched between the support membranes. The support membranes may for example be PTFE needlefelt membranes. The filter membrane may for example be a microporous membrane such as a PTFE membrane. The first membrane assembly may additionally comprise sealing members, such as O-rings. A respective sealing member may be provided on each of two sides of the first membrane assembly to provide sealing towards the first fluid pipe portion.

The support membranes provide mechanical strength to the filter membrane, so that it can withstand pressure. The support membranes are provided with a plurality of pores and allow liquid and gas to pass through them. The filter membrane allows gas to flow but stops any liquid such that a dry gas is provided to the first fluid outlet. The first membrane assembly furthermore protects the pressure compensating system and enables more gas to escape through the first fluid outlet, and thus reduces the gas pressure in the dual fluid flow system. Additionally, since the gas is pure and contains less moisture, the density of the gas can be approximated and in the design stage, the smallest diameter of the first fluid outlet can be designed accordingly. Furthermore, since the since the moisture is removed from the first fluid flow, it can be ensured that the pressure compensating system will not be flooded by water, which could reduce the functionality of the pressure compensating system.

Hence, according to one embodiment the pressure compensating system comprises a first membrane assembly which includes PTFE membranes and a microporous filter membrane configured to filter moisture and prevent flooding of the first fluid pipe portion.

Upstream of the second fluid outlet, the second fluid pipe portion may comprise a second gas filtration system including a second membrane assembly. The second membrane assembly is hence arranged such that the second fluid flow passes through the second membrane assembly before flowing through the second fluid outlet. The second membrane assembly may comprise a plurality of membranes, for example two support membranes such as two needlefelt or cloth membranes, and a filter membrane such as a PTFE membrane, sandwiched between the support membranes. The support membranes may for example be PTFE needlefelt membranes. The filter membrane may for example be a microporous membrane such as a PTFE membrane. The second membrane assembly may additionally comprise sealing members, such as O-rings. A respective sealing member may be provided on each of two sides of the second membrane assembly to provide sealing towards the second fluid pipe portion. The support membranes provide mechanical strength to the filter membrane, so that it can withstand pressure. The support membranes are provided with a plurality of pores and allow liquid and gas to pass through them. The filter membrane allows gas to flow but stops any liquid such that a dry gas is provided to the second fluid outlet. Due to the second membrane assembly, a hydrogen dryer, if the pressure compensating system is used in an electrolyser system, may be discarded with. Hydrogen dryers are large and contain resins to reduce the moisture. The second membrane assembly furthermore protects the pressure compensating system and enables more gas to escape through the second fluid outlet, and thus reduces the gas pressure in the dual fluid flow system. Additionally, since the gas is pure and contains less moisture, the density of the gas can be approximated and in the design stage, the smallest diameter of the second fluid outlet can be designed accordingly. Furthermore, since the since the moisture is removed from the second fluid flow, it can be ensured that the pressure compensating system will not be flooded by water, which could reduce the functionality of the pressure compensating system.

Hence, according to one embodiment the pressure compensating system comprises a second membrane assembly which includes PTFE membranes and a microporous filter membrane configured to filter moisture and prevent flooding of the second fluid pipe portion.

According to one embodiment in a direction from the first fluid inlet to the second fluid inlet along the fluid pipe, the first fluid outlet is arranged after the first fluid inlet followed by the second fluid outlet followed by the second fluid inlet.

According to one embodiment the pressure compensator comprises an incompressible fluid. Both ends of the pressure compensator will thus be displaced in the fluid pipe in response to any pressure difference between the first fluid pipe portion and the second fluid pipe portion.

According to one embodiment the incompressible fluid is a liquid.

According to one embodiment the pressure compensator comprises a first plunger and a second plunger, wherein the incompressible fluid is provided between the first plunger and the second plunger which act to seal the incompressible fluid therebetween.

According to one embodiment the first plunger has an outer surface provided with a friction-reducing coating. The friction-reducing coating may for example be, comprise or consist of PTFE. The first plunger will thereby contact the inner surface of the first pipe portion by means of the friction-reducing coating.

According to one embodiment the second plunger has an outer surface provided with a friction-reducing coating. The friction-reducing coating may for example be, comprise or consist of PTFE. The second plunger will thereby contact the inner surface of the second pipe portion by means of the friction-reducing coating Due to the friction-reducing coating, the static friction may in particular be reduced when one of the first plunger and the second plunger is moved from a static position due to a pressure difference. The risk of pressure loss in the pressure compensating system may thereby be reduced.

According to one embodiment the first fluid pipe portion may comprise or consist of stainless steel. The first fluid inlet may in this case beneficially be connected to an oxygen flow. Stainless steel does not react with oxygen.

According to one embodiment the second fluid pipe portion may comprise or consist of titanium. The second fluid inlet may in this case beneficially be connected to a hydrogen flow. Titanium may react with oxygen, and is therefore preferably not used for the material of the first fluid pipe portion.

According to one embodiment both the first fluid pipe portion and the second fluid pipe portion may be made of steel, for example stainless steel.

According to one embodiment the first plunger is configured to be in fluid communication with the first fluid inlet and the second plunger is configured to be in fluid communication with the second fluid inlet. Hereto, a surface of the first plunger is subjected to the pressure in the first fluid pipe portion and a surface of the second fluid pipe portion is subjected to the pressure in the in the second fluid pipe portion.

According to one embodiment the first fluid pipe portion and the second fluid pipe portion are connected via a bend and the pressure compensator is located in the bend. This configuration allows for example a U-shaped design of the fluid pipe with the first fluid pipe portion and the second fluid pipe portion extending in parallel. The first fluid flow may thereby flow directly towards the pressure compensator, without any bends, and the same also applies to the second fluid flow too.

According to one embodiment the first fluid pipe portion is provided with a first release valve configured to discharge fluid from the first fluid pipe portion in an initial state of the dual fluid flow system, and the second fluid pipe portion is provided with a second release valve configured to discharge fluid from the second fluid pipe portion in an initial state of the dual fluid flow system.

In this manner, air contained in the fluid pipe may be evacuated. Additionally, in case the pressure compensating system is included in a high-pressure electrolyser system including an electrolyser stack air inside spaces inside the electrolyser stack which are not submerged in water may be evacuated. The first release valve and the second release valve may be closed when the fluid pipe has been emptied of air. In electrolysis, for example, especially in a high-pressure electrolyser system which compresses hydrogen and oxygen, it is problematic to compress these elements in the presence of air.

The first release valve may be provided essentially facing, facing or upstream of the first fluid outlet. The second release valve may be provided essentially facing, facing or upstream of the second fluid outlet. This ensures that air may be evacuated through the first fluid pipe portion in the entire section between the first fluid inlet and the first fluid outlet, and through the second fluid pipe portion in the entire section between the second fluid inlet and the second fluid outlet.

According to one embodiment the first release valve and of the second release valve are configured to be controlled by external control. The opening and closing of the first release valve and the second release valve may thereby be controlled externally, e.g. by means of a release valve controller.

According to one embodiment the first release valve is a first solenoid valve and the second discharge vale is a second solenoid valve.

According to one embodiment the first fluid outlet has a first axial section with a tapering cross-section in the direction of the first fluid flow and a second axial section downstream of the first axial section with an increasing cross-section, and the second fluid outlet has a third axial section with a tapering cross-section in the direction of the second fluid flow and a fourth axial section downstream of the third axial section with an increasing cross-section. This configuration provides less heat generation, less turbulence, and lower pressure drop for the first fluid flow and the second fluid flow as they are discharged from the pressure compensating system.

According to one embodiment the first axial section and the second axial section form a converging-diverging nozzle structure which has a nozzle throat or waist having a diameter in the range of microns.

According to one embodiment the third axial section and the fourth axial section form a converging-diverging nozzle structure which has a nozzle throat or waist having a diameter in the range of microns.

According to one embodiment the first fluid outlet comprises or consists of stainless steel or a copper based alloy.

According to one embodiment the second fluid outlet comprises or consists of titanium or a copper based alloy.

There is according to a second aspect of the present disclosure provided a high-pressure electrolyser system comprising: an electrolyser stack provided with an oxygen gas outlet and a hydrogen gas outlet and a water inlet for filling the electrolyser stack with water, a water inlet valve configured to provide a one-way valve functionality of the water inlet, and a pressure compensating system according to the first aspect, wherein the first fluid inlet is connected to the oxygen gas outlet and the second fluid inlet is connected to the hydrogen gas outlet.

The high-pressure electrolyser system is due to the water pressure in the electrolyser stack able to compress the hydrogen gas and the oxygen gas in the electrolyser stack while electrolysis is taking place. This removes the need for external compression to compress the hydrogen gas and the oxygen gas. It does additionally not require any additional energy than what is necessary for the electrolysis. Low-cost gas compression may thus be obtained.

Additionally, since more hydrogen gas is generated than oxygen gas during electrolysis, the pressure compensating system ensures that the pressure inside the electrolyser stack is equalised. If pressure in the first fluid pipe portion and the second fluid pipe portion would not be equalised, the membranes that separate the hydrogen chambers and the oxygen chambers in the electrolyser stack would be subjected to overpressure. This overpressure could result in cross-contamination in the hydrogen and oxygen chambers through the membrane.

According to one embodiment the electrolyser stack comprises a plurality of electrode plates, each electrode plate having an inner metal frame provided with electrode elements, and an outer heat conducting polymer frame holding the inner metal frame. The electrolyser stack may thereby be made considerable lighter compared to if each electrode plate would be made entirely of metal.

According to one embodiment the electrolyser stack comprises a plurality of electrode plates, each electrode plate comprising an outer frame and electrode elements extending in a space between opposite sides of the outer frame, each electrode plate having a hydrogen channel and an oxygen channel extending through the outer frame, and a first outlet channel and a second outlet channel connecting the space and one of the hydrogen channel and the oxygen channel, wherein each first outlet channel has a tapering shape in a direction from the space to the hydrogen channel or oxygen channel and each second outlet channel has a tapering shape in a direction from the hydrogen channel or oxygen channel to the space.

For each electrode plate, the first outlet channel and the second outlet channels are both connected either to the hydrogen channel or to the oxygen channel.

Two adjacent electrode plates, acting as cathode and anode, in the electrolyser stack form an electrolytic cell. Adjacent electrode plates may be separated by means of a membrane to separate hydrogen gas and oxygen gas generated by the cathode and the anode, respectively.

In case an electrode plate is operated as an anode, the first outlet channel and the second outlet channel are connected to the oxygen channel. There is no fluid connection between the electrode elements and the hydrogen channel.

In case an electrode plate is operated as a cathode, the first outlet channel and the second outlet channel are connected to the hydrogen channel. There is no fluid connection between the electrode elements and the oxygen channel.

Each electrode plate has a height dimension, a width dimension, and a depth or thickness dimension. The first channel outlet and the second channel outlet are arranged one after the other in the depth or thickness direction.

Preferably, the first channel outlet is arranged upstream of the second channel outlet in the depth or thickness direction, with respect to the oxygen/hydrogen gas flow direction.

The minimal cross-sectional area of the first channel outlet may differ from the minimal cross-sectional area of the second channel outlet. The minimal cross-sectional area of the first channel outlet may be larger than the minimal cross-sectional area of the second channel outlet, for example.

The gas generated in an electrode plate due to electrolysis will mostly flow through the first outlet channel and reach the hydrogen channel or oxygen channel in which the first outlet channel opens/terminates, thereby compressing the gas up to about 35-40 bar. Some gas in the hydrogen channel or oxygen channel will again flow back into the space where the electrode elements are contained, due to back pressure, through the second outlet channel. There will be a cycle of this process and gas will further compress. Furthermore, if any water goes inside the hydrogen channel or oxygen channel, it will flow back inside the space again.

The high-pressure electrolyser system may also comprise a gas outlet valve, which may be a check-valve to allow a certain amount of hydrogen gas and oxygen gas to flow out from the electrolyser stack to provide further compression of the hydrogen gas and the oxygen gas.

One embodiment comprises a first pump and a second pump, a first sensor and a second sensor, and a pump control system configured to be connected to the first sensor and the second sensor, wherein the first sensor is configured to detect a water level in the electrolyser stack, wherein based on the water level the pump control system is configured to activate the first pump to pump more water into the electrolyser stack, wherein the second sensor is configured to detect a temperature in the electrolyser stack (25), wherein in case the temperature is above a threshold value, the pump control system is configured to activate the second pump to pump water from the electrolyser stack.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Examples of the inventive concept will now be described, by way of example, with reference to the accompanying drawings, in which:

FIG. 3 schematically shows a front view of an electrode plate;

FIG. 4*a* shows a first section of the electrode plate in FIG. 3; and

FIG. 4*b* shows a second section of the electrode plate in FIG. 3 parallel with the section shown in FIG. 4*a*.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
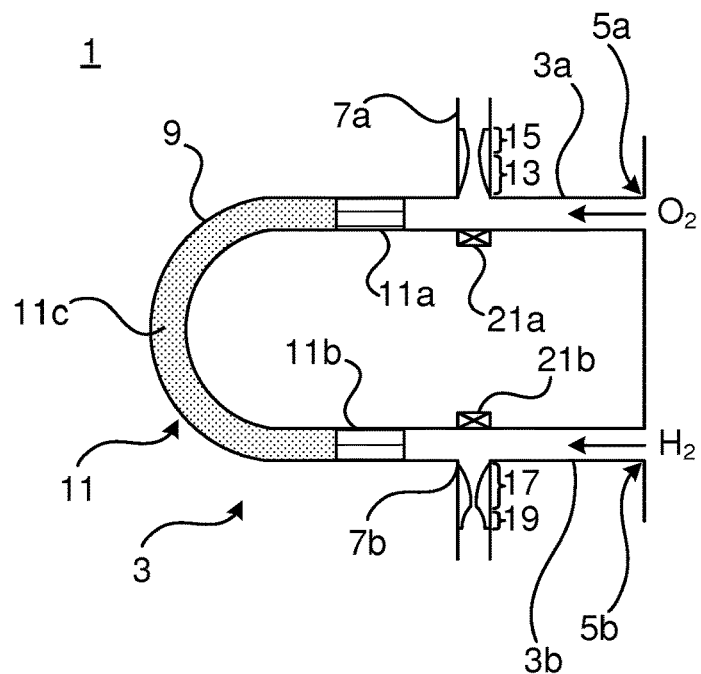
FIG. 1 schematically shows a top view of an example of a pressure compensating system.

FIG. 1 shows an example of a pressure compensating system 1 for a dual fluid flow system. In the following, the dual fluid flow system will be exemplified by a high-pressure electrolyser system. It is to be noted that the pressure compensating system 1 could be used with any dual fluid flow system for which the two fluid flows may be have different pressure, for equalising the pressure between the two fluid flows.

The pressure compensating system 1 comprises a fluid pipe 3. The fluid pipe 3 has a first fluid pipe portion 3*a* and a second fluid pipe portion 3*b*. The first fluid pipe portion 3*a* has a first fluid inlet and a first fluid outlet 7*a* for a first fluid flow. The second fluid pipe portion 3*b* has a second fluid inlet 5*b* and a second fluid outlet 7*b* for a second fluid flow. In the following, the first fluid flow will be exemplified by oxygen gas flow $O_2$ and the second fluid flow will be exemplified by hydrogen gas flow $H_2$.

In a direction from the first fluid inlet 5*a* to the second fluid inlet 5*b* along the fluid pipe 3, the first fluid inlet 5*a* is followed by the first fluid outlet 7*a*. The first fluid outlet 7*a* is followed by the second fluid outlet 7*b*. The second fluid outlet 7*b* is followed by the second fluid outlet 5*b*.

The exemplified fluid pipe 3 has a bend 9 between the first fluid outlet 7*a* and the second fluid outlet 7*b*. According to the present example, the bend 9 provides a 180° degree turn of the fluid pipe 3. The first fluid pipe portion 3*a* and the second fluid pipe portion 3*b* are hence arranged in parallel.

The pressure compensating system 1 furthermore comprises a pressure compensator 11. The pressure compensator 11 is contained in the fluid pipe 3.

The pressure compensator 11 may be arranged in the bend 9. The pressure compensator 11 separates the first fluid pipe portion 3*a* and the second fluid pipe portion 3*b*.

The pressure compensator 11 comprises a first plunger 11*a*, a second plunger 11*b* and an incompressible fluid 11*c* arranged between the first plunger 11*a* and the second plunger 11*b*. The first plunger 11*a* hence forms a first end of the pressure compensator 11 and the second plunger 11*b* forms a second end of the pressure compensator 11. The first plunger 11*a* and the second plunger act as seals to maintain the incompressible fluid 11*c* therebetween.

The incompressible fluid 11*c* may preferably be an incompressible liquid. The first fluid outlet 7*a* is provided with a Venturi tube-like section forming a first nozzle. Hereto, the first fluid outlet 7*a* has a first axial section 13 with a tapering cross-section in the direction of the first fluid flow $O_2$ and a second axial section 15 downstream of the first axial section 13 with an increasing cross-section.

The second fluid outlet 7*b* is provided with a Venturi tube-like section forming a second nozzle. Hereto, the second fluid outlet 7*b* has a third axial section 17 with a tapering cross-section in the direction of the second fluid flow $H_2$ and a fourth axial section 19 downstream of the third axial section 17 with an increasing cross-section.

The first axial section 13 and the second axial section 15, and the third axial section 17 and the fourth axial section 19 hence form converging-diverging nozzles. These nozzles may be specially calibrated to achieve a desired output pressure. For example, if it would be desired to output a pressure of 300 bar and a hydrogen gas flow of 1 $Nm^3$ per hour, assuming that the high-pressure electrolyser system can produce 1 $Nm^3$ hydrogen gas per hour, the nozzles can be calibrated so that 1 $Nm^3$/h hydrogen gas can only escape through the nozzle when the pressure reaches 300 bar in the electrolyser stack. The converging-diverging nozzle diameter, in particular the nozzle throat section or waist, which has the smallest diameter of the converging-diverging nozzle structure, will be different for the first fluid outlet 7*a* which discharges the oxygen gas, due to less oxygen than hydrogen and due to the different molecular weight of oxygen and hydrogen. The nozzle throat section or waist of the first fluid outlet 7*a* has a smaller diameter than the diameter of the nozzle throat section or waist of the second fluid outlet 7b. The smaller the diameter, the less gas can escape through the fluid outlet 7a, 7b under a certain pressure. The size of the diameter can be calculated in the design process required to flow a specific amount of gas under a certain pressure. In this manner, the output pressure capability can be changed by changing the converging-diverging nozzles. The throat diameters may according to one example be in the range of microns. Such diameters sizes can be made using for example laser micromachining. The first axial section 13 may be equal in length or longer than the second axial section 15. The third axial section 17 may be equal in length or longer than the fourth axial section 19. To this end, the converging portion of each of the first nozzle and the second nozzle may be longer than the corresponding diverging portion. The cross-sectional area of the converging portion may be reduced gradually until it reaches the throat diameter designed to achieve better compression, the calibrated flow rate per hour in a specific pressure, less flow-turbulence, reduced heat and increased nozzle life time. The outside surface of the first nozzle and the second nozzle may be provided with heat sink fins for natural convection of heat.

The exemplified pressure compensating system 1 furthermore comprises a first release valve 21a and a second release valve 21b. The first release valve 21a is configured to discharge fluid from the first fluid pipe portion 3a. The second release valve 21b is configured to discharge fluid from the second fluid pipe portion 3b. The first release valve 21a may for example be a solenoid valve. The second release valve 21b may for example be a solenoid valve.

The first release valve 21a may for example be arranged in a vertically upper or top region of the first fluid pipe portion 3a. Thereby, the evacuation of air may be facilitated because air is lighter than oxygen gas. Oxygen gas molecules may sink towards the bottom of the first fluid pipe portion 3a while air may rise upwards to the first release valve 21a.

The second release valve 21b may for example be arranged in a vertically lower or bottom region of the second fluid pipe portion 3b.

The first release valve 21a and the second release valve 21b may be configured to be controlled to open in an initial state of the pressure compensating system to discharge any gas contained in the fluid pipe 3 other than oxygen gas and hydrogen gas from the first fluid pipe portion 3a and the second fluid pipe portion 3b, respectively. When the fluid pipe 3 has been evacuated from such gas, the first release valve 21a and the second release valve 21b may be closed.

Thus, in operation, initially the first release valve 21a and the second release valve 21b are opened to evacuate any gas present in the fluid pipe 3 other than oxygen gas and hydrogen gas. When the gas has been evacuated, the release valves 21a and 21b are closed. In the even that the pressure compensating system 1 is used with an electrolyser oxygen gas $O_2$ will flow into the first fluid pipe portion 3a and hydrogen gas $H_2$ will flow into the second fluid pipe portion 3b. Eventually the pressure in the second fluid pipe portion 3b increases compared to the pressure in the first fluid pipe portion 3a due to the asymmetric oxygen gas and hydrogen gas production in electrolysis. This pressure difference causes the pressure compensator 11 to move inside the fluid pipe 3 towards the first fluid outlet 7a due to gas pressure on the second plunger 11b. The displacement of the pressure compensator 11 results in that the first plunger 11a partially obstructs or obstructs the first fluid outlet 7a, reducing the available cross-section for the oxygen gas $O_2$ to escape through the first fluid outlet 7a. In this manner, the pressure will increase in the first fluid pipe portion 3a, eventually resulting in a pressure equalisation in the first fluid pipe portion 3a and the second fluid pipe portion 3b. During electrolysis the pressure compensator n will be displaced in either direction based on a current differential pressure in the first fluid pipe portion 3a and the second fluid pipe portion 3b. The pressure compensator 11 hence provides pressure equalisation by self-adjustment due to pressure-generated displacement in the fluid pipe 3.

Due to the Venturi tube-like design in the first fluid outlet 7a and the second fluid outlet 7b, there will be less heat generation, less turbulence, and less pressure drop as the first fluid and the second fluid exit the pressure compensating system 1.

Figure 2:
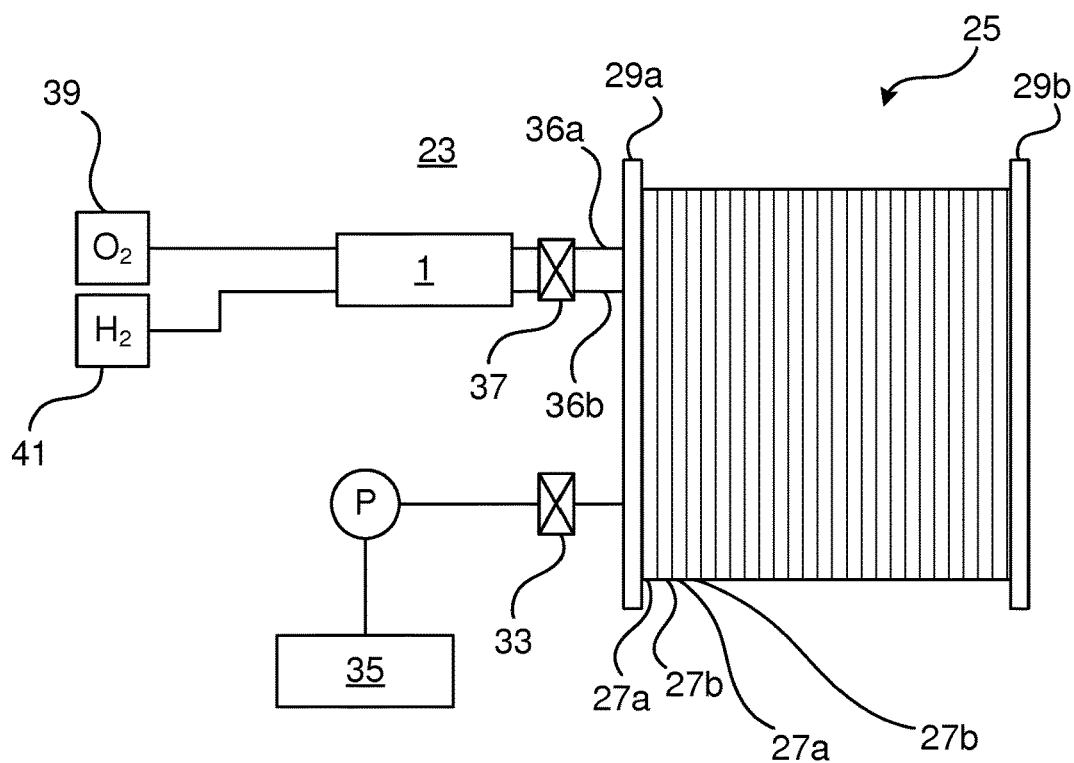
FIG. 2 schematically shows an example of a high-pressure electrolyser system.

FIG. 2 shows an example of a high-pressure electrolyser system 23. The high-pressure electrolyser system 23 comprises an electrolyser stack 25 and the pressure compensating system 1. The electrolyser stack 25 includes a plurality of electrode plates 27a and 27b. The electrode plates 27a and 27b are arranged in a stacked configuration one after the other. Each adjacent pair of electrode plates forms an electrolytic cell. Each electrode plate 27a and 27b is operated either as a cathode or as an anode, with each electrolytic cell having a cathode and an anode. Each electrode plate 27a and 27b has a frame structure comprising an inner frame and an outer frame, whereby a space is formed inside the inner frame. When the electrode plates 27a and 27b are stacked an electrolysis chamber configured to be filled with water is formed by the adjacent spaces.

The electrolyser stack 25 furthermore comprises a plurality of membranes. Each pair of adjacent electrode plates 27a and 27b is separated by a membrane so that each cathode forms a hydrogen chamber and each anode forms an oxygen chamber. The oxygen chambers and hydrogen chambers together form the electrolysis chamber. The membranes are configured to prevent hydrogen gas and oxygen gas to move between the electrode plates 27a and 27b in the electrolysis chamber.

The electrolyser stack 25 comprises a first end plate 29a forming a first end of the electrolyser stack 25 and a second end plate 29b forming a second end of the electrolyser stack 25. The electrode plates 27a and 27b are arranged between the first end plate 29a and the second end plate 29b.

The first end plate 29a is provided with two water inlets 31 configured to enable water to flow into the electrolysis chamber. The high-pressure electrolyser system 23 furthermore comprises two water inlet valves 33, one for each water inlet 31, configured to provide a check-valve functionality of a respective water inlet 31, a pump P and a pump controller 35.

The pump P is configured to pump water into the electrolyser stack 25 via the water inlets 31. The pump controller 35 is configured to control the pump P. For example, the pump controller 35 may be configured to operate the pump P only occasionally, such as once every hour. The pump controller 35 may hence use a timer function. The pump P may thus top up the water level in the electrolyser stack 25, which may hence be completely filled with water e.g. once every hour. Alternatively, other time frames may be used to operate the pump P by means of the pump controller 35. By operating the pump P only occasionally, energy may be saved while operating the high-pressure electrolyser system 23. Alternatively, the high-pressure electrolyser system may include one or more sensors to detect the water level in the electrolyser stack, wherein the pump controller 35 may be configured to control the pump based on the water level detected by the one or more sensors. As yet another alternative, the pump P could run at all times.

According to one example, the high-pressure electrolyser system 23 may comprise two pumps and two sensors. A first pump of the two pumps may be a high pressure pump and a second pump of the two pumps may be a low pressure pump. A first sensor may be configured to detect a water level in the electrolyser stack 25, and based on the water level, cause the pump controller 35 to activate the first pump to pump more water into the electrolyser stack. A second sensor may be configured to detect a temperature inside the electrolyser stack 25, and based on the temperature causes the pump controller 35, or alternatively another pump controller configured to control the second pump, to activate the second pump. The pump controller 35 or the other pump controller may be configured to activate the second pump for example if the temperature reaches a threshold value, for example 35 degrees or 40 degrees. The high-pressure electrolyser system may in general comprise a pump control system configured to control the first pump and the second pump. The pump control system may comprise the pump controller 35, which may be configured to control the first pump and according to one example also the second pump. The pump control system may according to one example comprise a dedicated controller configured to control the second pump. In this case, the pump control system would comprise two pump controllers, each configured to control a respective one of the first pump and the second pump. The second pump pumps water from the electrolyser stack when operated. The second pump hence functions as a cooling pump, enabling the high-pressure electrolyser system 23 to retain the same temperature to avoid overheating or self ignition of materials.

The electrolyser stack 25 further comprise an oxygen gas outlet 36a connected to the first fluid inlet 5a of the pressure compensating system 1 and a hydrogen gas outlet 36b connected to the second fluid inlet 5b of the pressure compensating system 1.

The high-pressure electrolyser system 23 may furthermore comprise gas outlet valves 37, which may be check-valves. The gas outlet valves 37 may be configured to allow a certain restricted gas flow of hydrogen gas and oxygen gas to flow out from the electrolyser stack 25 via the oxygen gas outlet 36a and the hydrogen gas outlet 36b to the pressure compensating system 1.

The first fluid outlet 7a of the pressure compensating system 1 may be connected to an oxygen gas pressure vessel 39 for storing the compressed oxygen gas and the second fluid outlet 7b may be connected to a hydrogen gas pressure vessel 41 for storing the compressed hydrogen gas.

FIG. 3 depicts an example of an electrode plate 27a or 27b. The exemplified electrode plate has an inner frame 43 and an outer frame 45. The inner frame 43 is preferably made of a metal with good electrical conducting properties, for example copper or aluminium. The inner frame 43 may hence be an inner metal frame. The outer frame 45 may be made of a heat conducting polymer. The outer frame 45 may hence be an outer heat conducting polymer frame. The outer frame 45 holds the inner frame 43. The outer frame 45 may for example be made by means of injection moulding. To this end, during manufacturing the inner frame may be placed inside an injection mould, wherein a heat conducting polymer is injected into the frame to form the outer frame 45.

The electrode plate 27a, 27b furthermore comprises electrode elements 46 extending between opposite sides of the inner frame 43 and hence also of the outer frame 45. The inner frame 43 delimits a space 47 in the region where the electrode elements 46 extend. This space 47 is an oxygen chamber in case the electrode plate is operated as an anode and a hydrogen chamber in case the electrode plate is operated as a cathode. The electrode plate 27a, 27b has a terminal 49 which is connected to the electrode elements 46 via the inner frame 43 and which is configured to be connected to a power supply.

The outer frame 45 is provided with an oxygen channel 51 and a hydrogen channel 53. Only one of these two channels 51 and 53 is configured to be in fluid communication with the space 47. In case the electrode plate is operated as an anode only the oxygen channel 51 is in fluid communication with the space 47 and in case the electrode plate is operated as a cathode only the hydrogen channel 53 is in fluid communication with the space 47. Since the electrode plates 27a and 27b are stacked alternatingly with a membrane covering the space 47 between them, every other electrode plate, i.e. every anode, will contribute to the oxygen gas stream in the oxygen channel 51 and every other plate, i.e. every cathode, will contribute to the hydrogen gas stream in the hydrogen channel 53.

In addition to the membranes, the electrolyser stack 25 may comprise a plurality of electrically insulating gaskets, each being sandwiched between two adjacent electrode plates 27a and 27b to provide electrical insulation and sealing between the electrode plates 27a and 27b.

Each electrode plate 27a, 27b may also comprise two water channels 55 and 57. A first water channel 55 of the two water channels may be connected to one of the water inlets 31 and a second water channel 57 of the two water channels may be connected to the other one of the water inlets 31. For an electrode plate 27a acting as anode the first water channel 55 is in fluid communication with the space 47, by means of a channel extending from the first water channel 55 to the space 47, while the second water channel 57 is not. For an electrode platen 27b acting as cathode the second water channel 57 is in fluid communication with the space 47 by means of a channel extending from the second water channel 57 to the space 47, while the first water channel 55 is not. This means that the anodes have their own water supply and the cathodes have their own water supply. This reduces the risk of cross-contamination between oxygen chambers and hydrogen chambers.

The first water channel 55 has a central channel portion and two oppositely arranged lateral fins 55a which are narrower compared to the central channel portion. The second water channel 57 has a central channel portion and two oppositely arranged lateral fins 57a which are narrower compared to the central channel portion. This provides the effect that the same or essentially the same water pressure can be provided along the length of the first water channel 55 and the second water channel 57 as they extend along the electrolyser stack 25. The oxygen channel 51 and the hydrogen channel 53 may according to one variation also have this configuration.

FIG. 4a shows a close-up view of a section through an electrode plate 27a acting as anode. The inner frame 43 and the outer frame 45 are provided with a first outlet channel 59 extending from the space 47 to the oxygen channel 51. The first outlet channel 59 has a Venturi tube-like design and is tapering in a direction from the space 47 to the oxygen channel 51. The hydrogen channel 53 of this electrode plate 27a has no opening to the space 47.

For an electrode plate 27b acting as a cathode the inner frame 43 and the outer frame 45 are provided with a first outlet channel extending from the space 47 to the hydrogen channel 53. The first outlet channel has a Venturi tube-like design and is tapering in a direction from the space 47 to the hydrogen channel 53. The oxygen channel 51 of this electrode plate 27b has no opening to the space 47.

FIG. 4b shows a close-up view of a section through the electrode plate 27a in parallel with the section shown in FIG. 4a but further downstream in the thickness direction of the electrode plate 27a. The inner frame 43 and the outer frame 45 are provided with a second outlet channel 61 extending from the space 47 to the oxygen channel 51. The second outlet channel 61 has a Venturi tube-like design and is tapering in a direction from the oxygen channel 51 to the space 47.

For an electrode plate 27b acting as a cathode the inner frame 43 and the outer frame 45 are provided with a second outlet channel extending from the space 47 to the hydrogen channel 53. The first outlet channel has a Venturi tube-like design and is tapering in a direction from the hydrogen channel 53 to the space 47.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A high-pressure electrolyser system comprising:
an electrolyser stack provided with an oxygen gas outlet and a hydrogen gas outlet and a water inlet for filling the electrolyser stack with water,
a water inlet valve configured to provide a one-way valve functionality of the water inlet, and
a pressure compensating system comprising:
a fluid pipe having a first fluid pipe portion and a second fluid pipe portion,
wherein the first fluid pipe portion has a first fluid inlet and a first fluid outlet for a first fluid flow,
wherein the second fluid pipe portion has a second fluid inlet and a second fluid outlet for a second fluid flow separate from the first fluid flow,
wherein the first fluid inlet is connected to the oxygen gas outlet and the second fluid inlet is connected to the hydrogen gas outlet, and
a pressure compensator arranged in the fluid pipe, separating the first fluid pipe portion and the second fluid pipe portion, wherein the pressure compensator is configured to move in the fluid pipe between the first fluid outlet and the second fluid outlet to thereby at least partially obstruct one of the first fluid outlet and the second fluid outlet in response to a pressure differences between the first fluid pipe portion and the second fluid pipe portion to provide pressure compensation between the first fluid pipe portion and the second fluid pipe portion,
wherein in a direction from the first fluid inlet directly to the second fluid inlet along an interior of the fluid pipe, the first fluid outlet is arranged after the first fluid inlet followed by the second fluid outlet followed by the second fluid inlet, and
wherein a first distance along the interior of the fluid pipe from the first fluid inlet directly to the second fluid inlet is greater than a second distance along the interior of the fluid pipe from the first fluid inlet directly to the first fluid outlet, and
wherein the pressure compensator is arranged:
closer to the first fluid outlet than the first fluid inlet, and
closer to the second fluid outlet than the second fluid inlet.

2. The high-pressure electrolyser system of claim 1, wherein the pressure compensator comprises an incompressible fluid.

3. The high-pressure electrolyser system of claim 1, wherein the first fluid pipe portion is provided with a first release valve configured to discharge fluid from the first fluid pipe portion in an initial state of the dual fluid flow system, and the second fluid pipe portion is provided with a second release valve configured to discharge fluid from the second fluid pipe portion in an initial state of the dual fluid flow system.

4. The high-pressure electrolyser system of claim 3, wherein the first release valve and of the second release valve are configured to be controlled by external control.

5. The high-pressure electrolyser system of claim 3, wherein the first release valve is a first solenoid valve and the second discharge valve is a second solenoid valve.

6. The high-pressure electrolyser system of claim 1, wherein the first fluid outlet has a first axial section with a tapering cross-section in the direction of the first fluid flow and a second axial section downstream of the first axial section with an increasing cross-section, and the second fluid outlet has a third axial section with a tapering cross-section in the direction of the second fluid flow and a fourth axial section downstream of the third axial section with an increasing cross-section.

7. The high-pressure electrolyser system of claim 6, wherein the first axial section and the second axial section form a converging-diverging nozzle structure which has a nozzle throat or waist having a diameter in the range of microns.

8. The high-pressure electrolyser system of claim 6, wherein the third axial section and the fourth axial section form a converging-diverging nozzle structure which has a nozzle throat or waist having a diameter in the range of microns.

9. The high-pressure electrolyser system of claim 1, wherein the electrolyser stack comprises a plurality of electrode plates, each electrode plate having an inner metal frame provided with electrode elements, and an outer heat conducting polymer frame holding the inner metal frame.

10. The high-pressure electrolyser system of claim 1, wherein the electrolyser stack comprises a plurality of electrode plates, each electrode plate comprising an outer frame and electrode elements extending in a space between opposite sides of the outer frame, each electrode plate having a hydrogen channel and an oxygen channel extending through the outer frame, and a first outlet channel and a second outlet channel connecting the space and one of the hydrogen channel and the oxygen channel, wherein each first outlet channel has a tapering shape in a direction from the space to the hydrogen channel or oxygen channel and each second outlet channel has a tapering shape in a direction from the hydrogen channel or oxygen channel to the space.

11. The high-pressure electrolyser system of claim 1, comprising:
a first pump and a second pump,
a first sensor and a second sensor, and
a pump control system configured to be connected to the first sensor and the second sensor,
wherein the first sensor is configured to detect a water level in the electrolyser stack, wherein based on the water level the pump control system is configured to activate the first pump to pump more water into the electrolyser stack,
wherein the second sensor is configured to detect a temperature in the electrolyser stack, wherein in case the temperature is above a threshold value, the pump control system is configured to activate the second pump to pump water from the electrolyser stack.

12. A high-pressure electrolyser system comprising:
an electrolyser stack provided with an oxygen gas outlet and a hydrogen gas outlet and a water inlet for filling the electrolyser stack with water,
a water inlet valve configured to provide a one-way valve functionality of the water inlet, and
a pressure compensating system comprising:
　a fluid pipe having a first fluid pipe portion and a second fluid pipe portion,
　wherein the first fluid pipe portion has a first fluid inlet and a first fluid outlet for a first fluid flow,
　wherein the second fluid pipe portion has a second fluid inlet and a second fluid outlet for a second fluid flow separate from the first fluid flow,
　wherein the first fluid inlet is connected to the oxygen gas outlet and the second fluid inlet is connected to the hydrogen gas outlet, and
　a pressure compensator arranged in the fluid pipe, separating the first fluid pipe portion and the second fluid pipe portion, wherein the pressure compensator is configured to move in the fluid pipe between the first fluid outlet and the second fluid outlet to thereby at least partially obstruct one of the first fluid outlet and the second fluid outlet in response to a pressure differences between the first fluid pipe portion and the second fluid pipe portion to provide pressure compensation between the first fluid pipe portion and the second fluid pipe portion,
wherein in a direction from the first fluid inlet directly to the second fluid inlet along an interior of the fluid pipe, the first fluid outlet is arranged after the first fluid inlet followed by the second fluid outlet followed by the second fluid inlet,
wherein a first distance along the interior of the fluid pipe from the first fluid inlet directly to the second fluid inlet is greater than a second distance along the interior of the fluid pipe from the first fluid inlet directly to the first fluid outlet,
wherein the pressure compensator comprises an incompressible fluid, and
wherein the pressure compensator comprises a first plunger and a second plunger, wherein the incompressible fluid is provided between the first plunger and the second plunger which act to seal the incompressible fluid therebetween.

13. A high-pressure electrolyser system comprising:
an electrolyser stack provided with an oxygen gas outlet and a hydrogen gas outlet and a water inlet for filling the electrolyser stack with water,
a water inlet valve configured to provide a one-way valve functionality of the water inlet, and
a pressure compensating system comprising:
　a fluid pipe having a first fluid pipe portion and a second fluid pipe portion,
　wherein the first fluid pipe portion has a first fluid inlet and a first fluid outlet for a first fluid flow,
　wherein the second fluid pipe portion has a second fluid inlet and a second fluid outlet for a second fluid flow separate from the first fluid flow,
　wherein the first fluid inlet is connected to the oxygen gas outlet and the second fluid inlet is connected to the hydrogen gas outlet, and
　a pressure compensator arranged in the fluid pipe, separating the first fluid pipe portion and the second fluid pipe portion, wherein the pressure compensator is configured to move in the fluid pipe between the first fluid outlet and the second fluid outlet to thereby at least partially obstruct one of the first fluid outlet and the second fluid outlet in response to a pressure differences between the first fluid pipe portion and the second fluid pipe portion to provide pressure compensation between the first fluid pipe portion and the second fluid pipe portion,
wherein in a direction from the first fluid inlet directly to the second fluid inlet along an interior of the fluid pipe, the first fluid outlet is arranged after the first fluid inlet followed by the second fluid outlet followed by the second fluid inlet,
wherein a first distance along the interior of the fluid pipe from the first fluid inlet directly to the second fluid inlet is greater than a second distance along the interior of the fluid pipe from the first fluid inlet directly to the first fluid outlet, and
wherein the first fluid pipe portion and the second fluid pipe portion are connected via a bend and the pressure compensator is located in the bend.

* * * * *